US011201992B2

(12) United States Patent
Guidi et al.

(10) Patent No.: US 11,201,992 B2
(45) Date of Patent: Dec. 14, 2021

(54) SENSOR CLAMPING DESIGN FOR AUTONOMOUS VEHICLE CAMERA

(71) Applicant: Waymo LLC, Mountain View, CA (US)

(72) Inventors: Giulia Guidi, Mountain View, CA (US); Shane McGuire, Redwood City, CA (US); Michael Shagam, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 170 days.

(21) Appl. No.: 16/722,993

(22) Filed: Dec. 20, 2019

(65) Prior Publication Data

US 2020/0204711 A1 Jun. 25, 2020

Related U.S. Application Data

(60) Provisional application No. 62/783,623, filed on Dec. 21, 2018.

(51) Int. Cl.
*H04N 5/225* (2006.01)
*B60R 11/04* (2006.01)

(52) U.S. Cl.
CPC ........... *H04N 5/2254* (2013.01); *B60R 11/04* (2013.01); *H04N 5/2252* (2013.01); *H04N 5/2253* (2013.01)

(58) Field of Classification Search
CPC .. H04N 5/2254; H04N 5/2252; H04N 5/2253; B60R 11/04
See application file for complete search history.

(56) References Cited

U.S. PATENT DOCUMENTS

| 9,800,858 | B2 | 10/2017 | Takahashi | |
|---|---|---|---|---|
| 2009/0269050 | A1 | 10/2009 | Fukuhara et al. | |
| 2010/0328525 | A1 | 12/2010 | Lee et al. | |
| 2013/0235259 | A1* | 9/2013 | Dharmatilleke | H04N 13/026 348/373 |
| 2014/0313337 | A1* | 10/2014 | Devota | B60R 11/04 348/148 |
| 2016/0227193 | A1 | 8/2016 | Osterwood et al. | |

(Continued)

FOREIGN PATENT DOCUMENTS

| EP | 3093882 | 11/2016 |
|---|---|---|
| KR | 1020170116223 | 10/2017 |
| WO | 2017/003678 | 1/2017 |

*Primary Examiner* — Seung C Sohn
(74) *Attorney, Agent, or Firm* — McDonnell Boehnen Hulbert & Berghoff LLP

(57) ABSTRACT

The present disclosure relates to optical systems and methods of their manufacture. An example optical system includes a lens assembly having at least one lens. The lens assembly defines an optical axis, a focal distance, and a corresponding focal plane. The optical system includes a substrate having a first surface and an image sensor attached to the first surface of the substrate. The optical system also includes a sensor holder attached to the first surface of the substrate. The sensor holder positions the image sensor along the optical axis and substantially at the focal plane. The optical system includes a registration body having a first registration surface and a second registration surface. The lens assembly is coupled to the first registration surface and the sensor holder is coupled to the second registration surface.

20 Claims, 12 Drawing Sheets

(56) References Cited

U.S. PATENT DOCUMENTS

| | | |
|---|---|---|
| 2016/0234410 A1 | 8/2016 | Das |
| 2018/0057412 A1 | 3/2018 | Kato et al. |
| 2018/0288293 A1 | 10/2018 | Byrne et al. |

* cited by examiner

SENSOR CLAMPING DESIGN FOR AUTONOMOUS VEHICLE CAMERA

CROSS-REFERENCE TO RELATED APPLICATIONS

The present application is a patent application claiming priority to U.S. Patent Application Ser. No. 62/783,623 filed Dec. 21, 2018, the contents of which are hereby incorporated by reference.

BACKGROUND

Conventional imaging systems can be configured to acquire electronic motion pictures. Such imaging systems can include video cameras, smartphones, web cams, digital single lens reflex (DSLR) cameras with video capabilities, etc.

In some scenarios, imaging systems can be fixed focal length systems. In such examples, the focal plane of such systems is substantially fixed during normal operation of the imaging system.

SUMMARY

The present disclosure generally relates to imaging systems and methods of their manufacture. Example embodiments include imaging systems configured to maintain an image sensor at a desired working distance with respect to a lens assembly.

In a first aspect, an optical system is provided. The optical system includes a lens assembly including at least one lens. The lens assembly defines an optical axis, a focal distance, and a corresponding focal plane. The optical system includes a substrate having a first surface. The optical system also includes an image sensor attached to the first surface of the substrate. The optical system additionally includes a sensor holder attached to the first surface of the substrate. The sensor holder positions the image sensor along the optical axis and substantially at the focal plane.

In a second aspect, a method is provided. The method includes coupling a sensor holder to a first surface of a substrate. An image sensor is coupled to the first surface. The method also includes coupling a lens assembly to the sensor holder such that the image sensor is positioned along an optical axis and substantially at a focal plane defined by the lens assembly.

Other aspects, embodiments, and implementations will become apparent to those of ordinary skill in the art by reading the following detailed description, with reference where appropriate to the accompanying drawings.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

Conventional imaging systems can be configured to acquire electronic motion pictures. Such imaging systems can include video cameras, smartphones, web cams, digital single lens reflex (DSLR) cameras with video capabilities, etc.

Imaging systems often include several different materials, each of which has its own coefficient of thermal expansion (CTE). Because of different materials having different CTEs, thermal cycling can cause components of the imaging system to become misaligned and/or improperly spaced from one another. For example, some substrate materials (e.g., printed circuit boards (PCBs)) may have a different CTE compared to that of other materials in the system. As a result, even if the components of the imaging system are initially assembled in a desired arrangement, that arrangement may change over time due to temperature cycling that may cause destressing, debowing, and/or other material relaxation behavior.

However, in some applications, it may be desirable for a given arrangement of parts to remain fixed with respect to one another, regardless of the effects of temperature cycling. For instance, it may be beneficial for a fixed focus camera to maintain a constant distance between an image sensor (e.g., a focal plane array or another type of image sensor) and various optical elements so as to maintain an accurate focus position.

In the present disclosure, an optical system includes an image sensor that is positioned by a sensor holder to reduce or eliminate debowing/destressing over several thermal cycles. Such a system can beneficially maintain an image sensor at very accurate focus position, which is desirable for fixed focus cameras with large area image sensors.

II. Example Optical Systems

Figure 1:
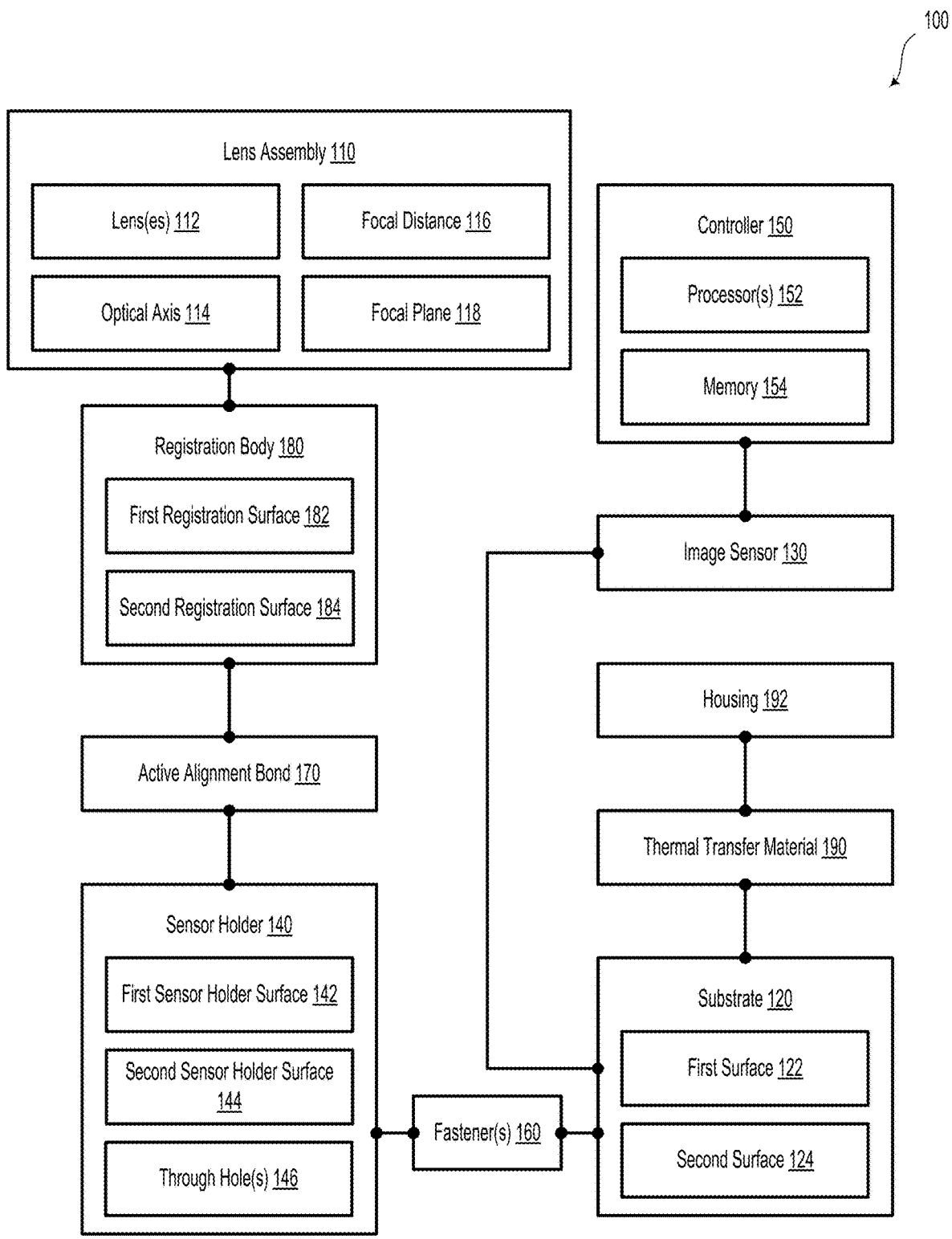
FIG. 1 illustrates an optical system, according to an example embodiment.

FIG. 1 illustrates an optical system 100, according to an example embodiment. The optical system includes a lens assembly 110. The lens assembly 110 includes at least one lens 112. The lens assembly 110 and the at least one lens 112 define an optical axis 114, a focal distance 116, and a corresponding focal plane 118. The at least one lens 112 could include one or more plano-convex lenses, a prism lens, a cylindrical lens, a conical lens, and/or other type of lens.

The optical system 100 also includes a substrate 120 having a first surface 122 and a second surface 124 opposite the first surface 122. In an example embodiment, the substrate 120 could be formed of a ceramic material. Additionally or alternatively, the substrate 120 could include a glass-reinforced epoxy laminate material, such as FR-4. Other types of rigid substrate materials are possible and contemplated in the present disclosure.

The optical system 100 additionally includes an image sensor 130 attached to the first surface 122 of the substrate 120. The image sensor 130 could include a focal plane array or another type of multi-element photodetector sensor. For example, the image sensor 130 could include a plurality of charge-coupled device (CCD) elements and/or a plurality of complementary metal-oxide-semiconductor (CMOS) elements. In some embodiments, the optical system 100 could include a plurality of image sensors. In an example embodiment, the image sensor 130 could be configured to detect light in the infrared spectrum (e.g., about 700 nanometers to about 1000 nanometers) and/or within the visible spectrum (e.g., about 400 nanometers to about 700 nanometers). Other spectral ranges are possible and contemplated herein.

The image sensor 130 could be configured (e.g., sized or dimensioned) according to an image sensor format. For example, the image sensor 130 could include a 16 millimeter format (e.g., 16 millimeter diagonal format and/or a one-inch video camera tube equivalent) or a full-frame (e.g., 35 millimeter) format sensor. Additionally or alternatively, the image sensor 130 could include "crop sensor" formats, such as APS-C (e.g., 28.4 mm diagonal) or one inch (e.g., 15.86 mm diagonal) formats. Other image sensor formats are contemplated and possible within the scope of the present disclosure.

In some embodiments, the image sensor 130 could include an alumina (e.g., $Al_2O_3$) package or another type of semiconductor device packaging material.

The optical system 100 yet further includes a sensor holder 140 attached to the first surface 122 of the substrate 120. In some embodiments, the sensor holder 140 may be positioned during an active alignment process described below to position the image sensor 130 along the optical axis 114 and substantially at the focal plane 118. In some embodiments, the sensor holder 140 could be formed from aluminum, steel, ceramic, carbon fiber, composite materials, or another type of rigid material. The sensor holder 140 could have a flat plate-like shape and could include an opening to provide physical and optical access for the image sensor 130. In an example embodiment, the sensor holder 140 could include a rectangular or square plate of material with a rectangular or square opening for access to the image sensor 130. In an example embodiment, the sensor holder 140 could be between 2 millimeters and 5 millimeters thick, although other thicknesses and dimensions of the sensor holder 140 are contemplated. In some examples, the sensor holder 140 could be formed from and/or coated with a material and/or surface having a low reflectivity in the operating wavelength range of the optical system 100. As an example, the sensor holder 140 could be coated with an anti-reflective material (e.g., a light-absorbing material or an optical interference layer) configured to attenuate light reflections at least in the visible and/or infrared wavelength range.

In some example embodiments, the optical system 100 could include a registration body 180 having a first registration surface 182 and a second registration surface 184. In such scenarios, the lens assembly 110 is coupled to the first registration surface 182 and the sensor holder 140 is coupled to the second registration surface 184. In some embodiments, the registration body 180 could be formed from similar materials as the sensor holder 140. For example, the registration body 180 could be formed from steel, aluminum, or another type of rigid material.

In some embodiments, the sensor holder 140 could be coupled to the second registration surface 184 by way of an active alignment bond 170. In such scenarios, the active alignment bond 170 comprises epoxy or another type of adhesive. As an example, the active alignment bond 170 could be formed using an active alignment process. In such a scenario, the active alignment process could include causing the image sensor 130 to image a scene through the lens assembly 110. The active alignment process could additionally include adjusting a fine alignment position of the image sensor based on the images, which could include a real-time alignment process. In such examples, the active alignment process could adjust a position of the image sensor 130 so that it is substantially located at the focal plane 118 of the lens assembly 110. For example, the active alignment process could include 6-axis hexapod configured to adjust a position of the image sensor 130 until it provides images indicate that the image sensor 130 is substantially located at the focal plane 118 (for example by providing in-focus images of a calibration target). Thereafter, an epoxy material could be applied to an opening or a joint between the lens assembly 110 and the registration body 180 (e.g., at the first registration surface 182) and/or between the registration body 180 and the sensor holder 140 (e.g., at the second registration surface 184). Application of the active alignment bond 170 could occur elsewhere so as to fix the relative position of two or more other elements of the optical system 100, as contemplated within the scope of the present disclosure. It will be understood that in some embodiments the active alignment process could include other controllable devices with 6 independent axes of motion. In other embodiments, one or more stepper motors or mechanical actuators could be utilized in the active alignment process.

In various examples, the focal distance 116 could be a fixed focal length. That is, the focal distance 116 could be substantially invariant during normal operation of the optical system 100. In such scenarios, the optical system 100 could be a fixed-focal length system (e.g., a system that does not include an auto-focus mechanism). Such a fixed-focal length system may beneficially provide real-time imaging with higher reliability than auto-focused systems and without auto-focus time lag.

In an example embodiment, the sensor holder 140 could be coupled to the first surface 122 of the substrate 120 by way of a plurality of fasteners 160. In such scenarios, the sensor holder 140 could include one or more threaded through holes 146. The plurality of fasteners 160 could include, for example, at least two threaded bolts. The fasteners 160 could be formed of aluminum, steel, or another type of structural material.

In such examples, the respective bolts could pass through the substrate 120 and thread into the through holes 146 of the sensor holder 140. In such a scenario, the bolt head of the fasteners 160 could abut the second surface 124 of the substrate 120 and thread into the sensor holder 140 that abuts the first surface 122 of the substrate 120. In this way, a compressive force could be applied to the substrate 120. However, other ways of applying a compressive force to the substrate 120 are possible and are contemplated within the present disclosure.

In some examples, the sensor holder 140 prevents movement of the substrate 120 and the image sensor 130 with respect to the lens assembly 110 due to thermal-cycle-induced debowing or destressing (e.g., as described below with reference to FIGS. 2A-2D).

In various example embodiments, the sensor holder 140 could be configured to maintain a position of the image sensor 130 within 10 microns of the focal plane 118 of the lens assembly 110. In other embodiments, the sensor holder 140 could be configured to maintain a position of the image sensor 130 within 2 microns, 5 microns, 20 microns, 50 microns, or another distance relative to the focal plane 118.

In some examples, the sensor holder 140 could be configured to maintain a position of the image sensor 130 with respect to the lens assembly 110 over numerous (e.g., 25 or more) thermal cycles between −40° C. to 85° C.

While the sensor holder 140 is described herein as being a flat plate with an opening, it will be understood that the sensor holder 140 could take other forms. For example, the sensor holder 140 could include two plates that "sandwich" the substrate 120 from opposing directions. That is, in such a scenario, the two plates of the sensor holder 140 could be respectively coupled to the first surface 122 of the substrate 120 and the second surface 124 of the substrate 120. The fasteners 160 could thread through one or more of the plates of the sensor holder 140 so as to apply a compressive force on the substrate 120.

In example embodiments, the optical system 100 could also include a housing 192. The housing 192 could include, among other possibilities, an external protective surface or coating. The housing 192 could include, for example, an outer shell or wall of the optical system 100. In some embodiments, the housing 192 could include an acrylic material formed in a sheet, dome, cylinder, or another shape. Other rigid materials that could form the housing 192 are possible and contemplated. In such scenarios, the optical system 100 could include a thermal transfer material 190 that is arranged between the second surface 124 of the substrate 120 and the housing 192. The thermal transfer material 190 could include a material having a thermal conductivity of at least 1.0, 1.5, 2.0, or 5.0 W/(m·K), or a within range between 1.0 to 10.0 W/(m·K). In some embodiments, the thermal transfer material 190 could include a thermal gap pad. However, other types of thermal transfer materials are contemplated and possible within the scope of the present disclosure.

In some examples, the optical system 100 also includes a controller 150. The controller 150 includes at least one of a field-programmable gate array (FPGA) or an application-specific integrated circuit (ASIC). Additionally or alternatively, the controller 150 may include one or more processors 152 and a memory 154. The one or more processors 152 may include a general-purpose processor or a special-purpose processor (e.g., digital signal processors, etc.). The one or more processors 152 may be configured to execute computer-readable program instructions that are stored in the memory 154. As such, the one or more processors 152 may execute the program instructions to provide at least some of the functionality and operations described herein.

The memory 154 may include or take the form of one or more computer-readable storage media that may be read or accessed by the one or more processors 152. The one or more computer-readable storage media can include volatile and/or non-volatile storage components, such as optical, magnetic, organic or other memory or disc storage, which may be integrated in whole or in part with at least one of the one or more processors 152. In some embodiments, the memory 154 may be implemented using a single physical device (e.g., one optical, magnetic, organic or other memory or disc storage unit), while in other embodiments, the memory 154 can be implemented using two or more physical devices.

As noted, the memory 154 may include computer-readable program instructions that relate to operations of optical system 100. As such, the memory 154 may include program instructions to perform or facilitate some or all of the functionality described herein. The controller 150 is configured to carry out operations. In some embodiments, controller 150 may carry out the operations by way of the processor 152 executing instructions stored in the memory 154.

In some examples, the operations could include controlling the image sensor 130 to capture one or more images by way of the lens assembly 110. Controlling the image sensor 130 could include adjusting, selecting, and/or instructing the image sensor 130 to capture the one or more images according to one or more image capture properties. The image capture properties could include a desired aperture, desired exposure time, and/or a desired image sensor light sensitivity (e.g., ISO), among other possibilities.

The controller 150 could be configured to carry out other operations relating to the capture of images using optical system 100. In some examples, the optical system 100 could optionally include one or more illumination devices (e.g., light-emitting diodes). In an example embodiment, the controller 150 could coordinate the operation of the illumination devices so as to properly illuminate a scene before and/or during image capture by the image sensor 130.

Figure 2A:
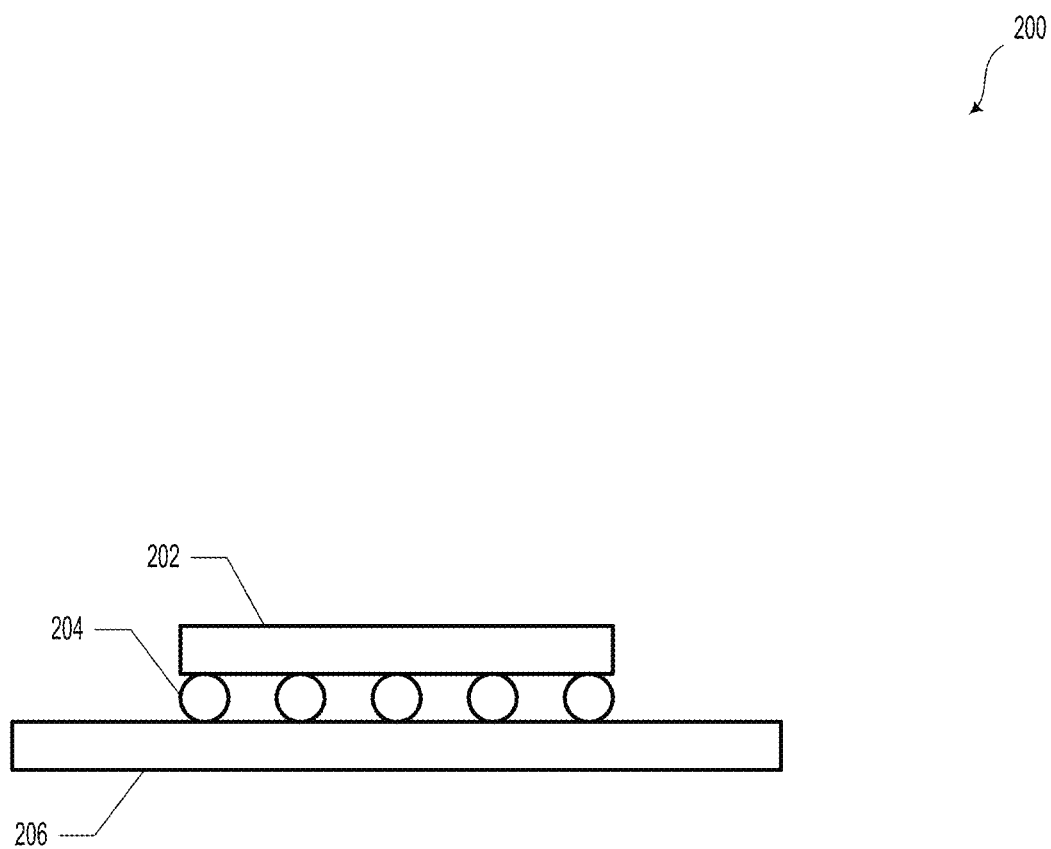
FIG. 2A illustrates a portion of an optical system, according to an example embodiment.

FIG. 2A illustrates a portion of an optical system 200, according to an example embodiment. As illustrated, the optical system 200 includes an image sensor 202, a plurality of connectors 204, and a substrate 206. The connectors 204 could electrically and/or physically couple the image sensor 202 to the substrate 206. The connectors 204 could be provided with a land grid array (LGA), a ball grid array (BGA), pin grid array (PGA), surface mount pads, wire bonds, and/or other types of electrical connections.

FIG. 2A could illustrate a bonding condition while attaching the image sensor 202 to the substrate 206. For example, FIG. 2A may illustrate a scenario during reflow of the connectors 204. In such a scenario, the reflow temperature could be approximately 250° C.

In general, the elements of optical system 200 could include disparate materials. For example, the image sensor 202 could include a semiconductor material, such as silicon or gallium arsenide. In other instances, the image sensor 202 could be packaged in an alumina package. The connectors 204 could include gold-plated copper, aluminum, and/or other conductive metal materials. The substrate 206 could include a printed circuit board material, such as FR-4. In an example embodiment, each element of the optical system 200 could have a different coefficient of thermal expansion (CTE). The CTE could include a measure of how the size of a given object changes with a change in temperature. For example, the CTE for each material could include the factional change in size (e.g., length and/or volume) per degree change in temperature for a given pressure.

As an example, an alumina sensor package could have a CTE of approximately 7 ppm/° C. In such scenarios, a printed circuit board could have a CTE of approximately 14 ppm/° C.

Figure 2B:
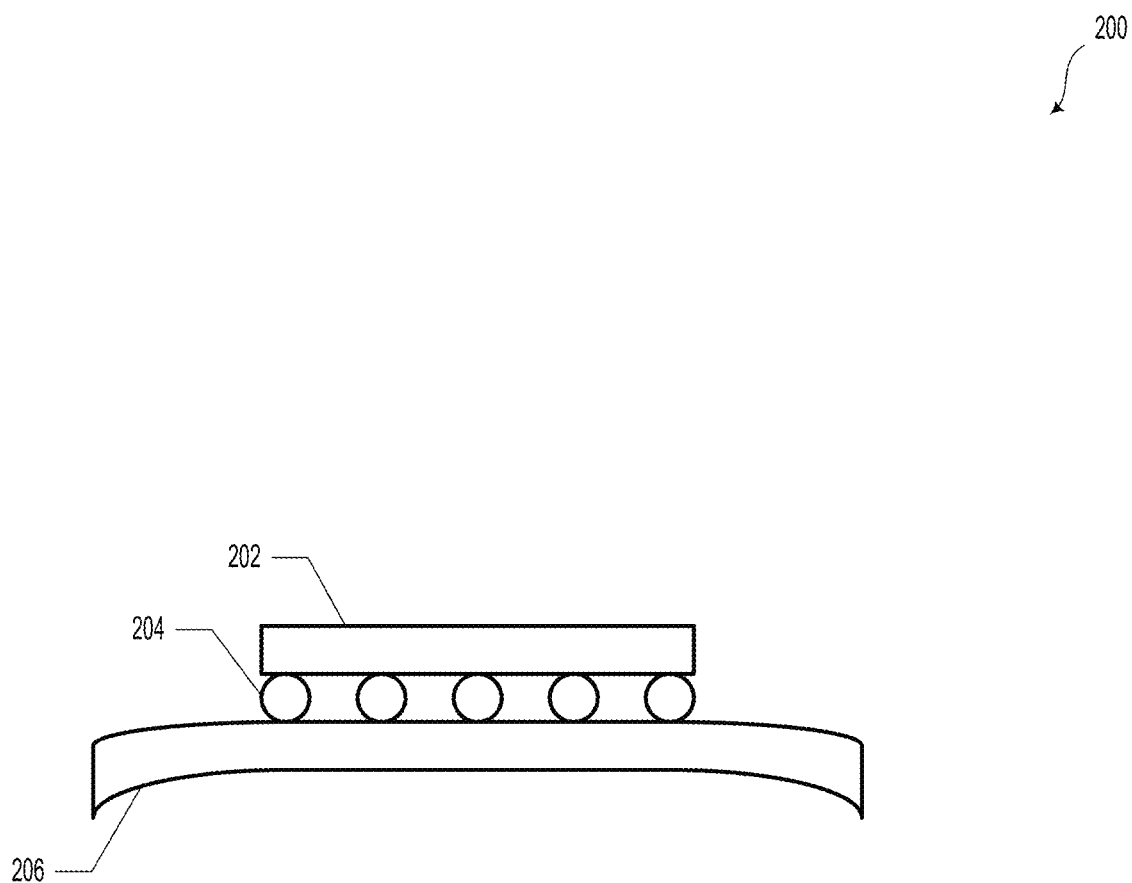
FIG. 2B illustrates a portion of an optical system, according to an example embodiment.

FIG. 2B illustrates a portion of the optical system 200 illustrated in FIG. 2A, according to an example embodiment. FIG. 2B could illustrate a condition after the optical system 200 has cooled to room temperature (e.g., approximately 20° C.). In this example, due to CTE mismatch (e.g., approximately 40 microns in a lateral direction), the substrate 206 is deformed (e.g., warped and/or bent) due to material stresses caused by the material of the FR-4 printed circuit board (substrate 206) contracting at a greater rate than the alumina image sensor 202.

Figure 2C:
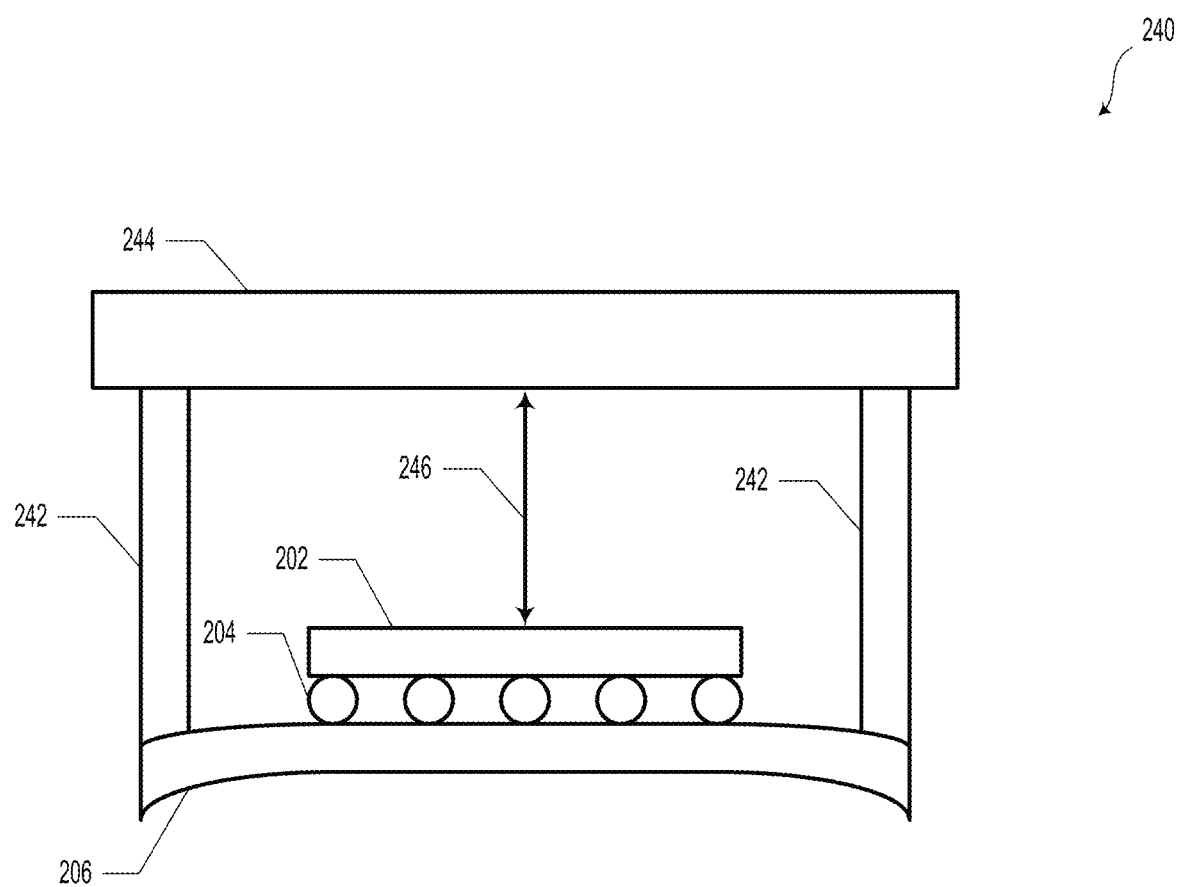
FIG. 2C illustrates a portion of an optical system, according to an example embodiment.

FIG. 2C illustrates a portion of an optical system 240, according to an example embodiment. In this example, the substrate 206 (in a bowed or stressed condition) is attached to a registration body 242, and the registration body 242 is attached to a lens assembly 244. The attachment of these components could be carried out at approximately room temperature (e.g., approximately 20° C.) such that a distance 246 between the image sensor 202 and the lens assembly 244 corresponds to a focal distance of the lens assembly 244 (e.g., the image sensor 202 is located at a focal plane of the of the lens assembly 244).

Figure 2D:
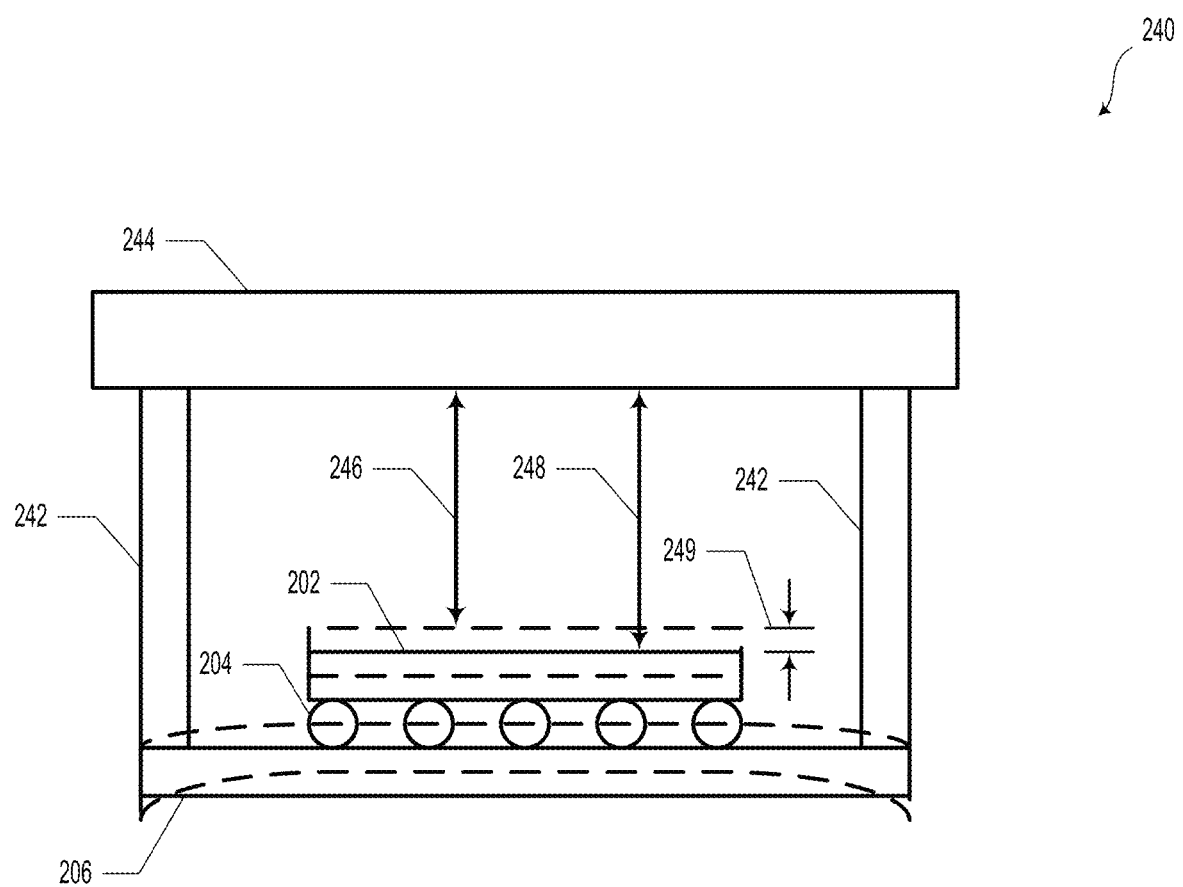
FIG. 2D illustrates a portion of an optical system, according to an example embodiment.

FIG. 2D illustrates the portion of the optical system 240 illustrated in FIG. 2C at a later time, according to an example embodiment. Over time and multiple thermal cycles (e.g., approximately 25 temperature oscillations between approximately −40° C. and 85° C.), the substrate 206 may "destress" and relax so that a shape of the substrate 206 substantially reverts to a flat, planar, shape. As a result, a distance 248 between the image sensor 202 and the lens assembly 244 at the later time could be greater than the original distance 246 due to the substrate 206 "flattening out" to its relaxed state. In some embodiments, the difference between the "stressed" distance 246 and the "relaxed" distance 248 could be 20 microns, 30 microns, 50 microns, or more. For fixed focal length optical systems, this change in distance between the image sensor 202 and the lens assembly 244 can adversely affect image capture by providing defocused, blurred, or otherwise distorted images. The systems and methods described herein may beneficially eliminate or reduce the change in distance between the image sensor 202 and the lens assembly 244 that can occur over time due to temperature cycling.

Figure 3:
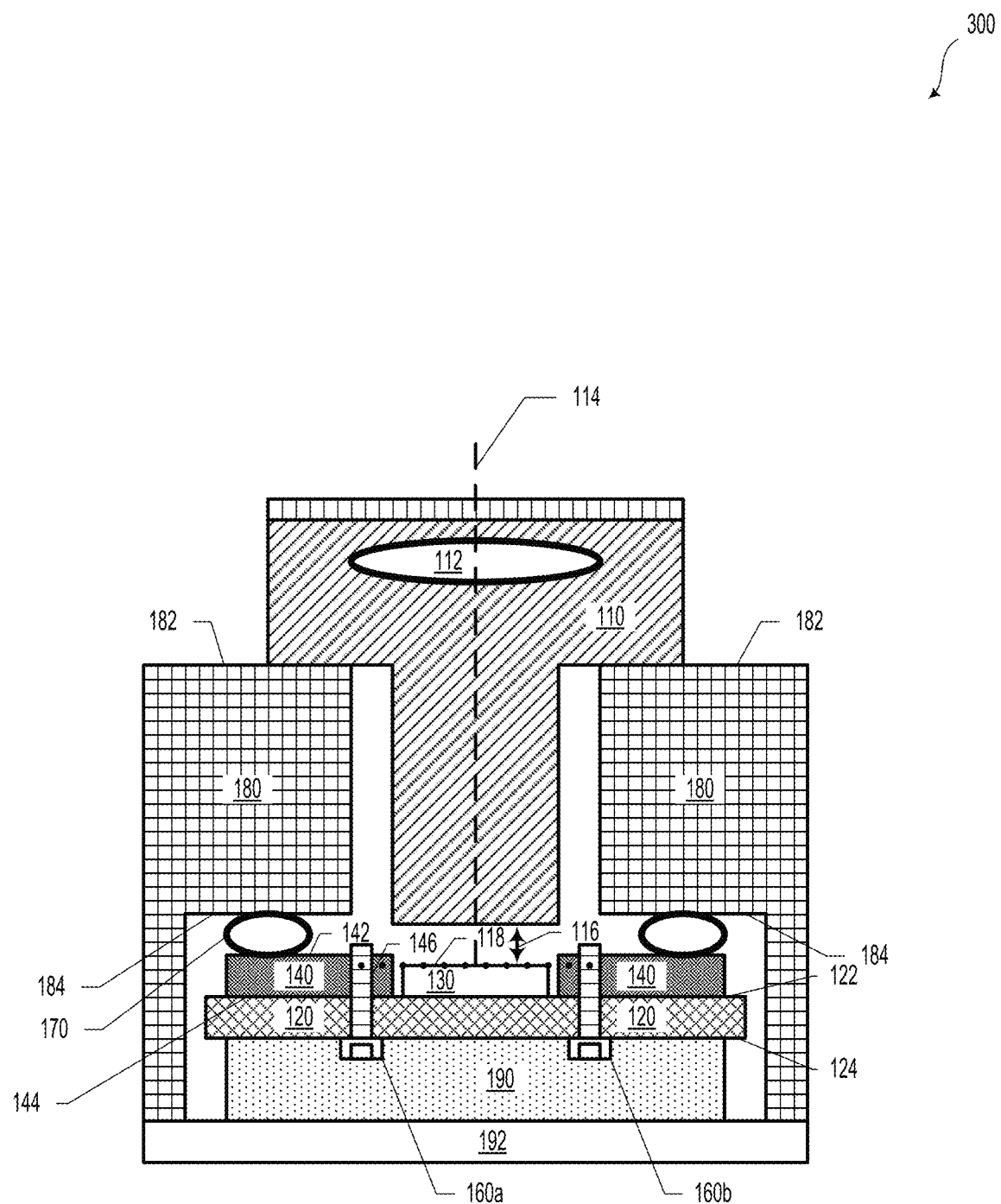
FIG. 3 illustrates an optical system, according to an example embodiment.

FIG. 3 illustrates an optical system 300, according to an example embodiment. The optical system 300 could include similar or identical elements as that of optical system 100, as illustrated and described in reference to FIG. 1. For example, optical system 300 includes a lens assembly 110, which could incorporate one or more lenses 112. The lens assembly 110 (and/or the lens 112) could define an optical axis 114 as well as a focal distance 116 and a focal plane 118, which could be represented by a plane perpendicular to the optical axis 114 and where the plane intersects the focal distance 116 along the optical axis 114 with respect to the lens assembly 110. In some embodiments, the focal plane 118 could represent where a surface of the image sensor 130 could be positioned so as to obtain images with an optimal focus.

Optical system 300 includes a registration body 180 which could be positioned between the lens assembly 110 and the sensor holder 140. In an example embodiment, the registration body 180 and the sensor holder 140 could be coupled by way of an active alignment bond 170. In some embodiments, the active alignment bond 170 could substantially fix the sensor holder 140 and the image sensor 130 at the focal distance 116. The sensor holder 140 may be coupled to a substrate 120 by way of one or more fasteners 160a and 160b.

The substrate 120 could be thermally and/or physically coupled to a housing 192 by way of a thermal transfer material 190, such as a thermal gap pad. As an example, the thermal gap pad could be formed from a silicone elastomer material and could include one or more tacky surfaces. The thermal gap pad could include a Bergquist Gap Pad 1500, which could include an unreinforced gap-filling material. The thermal gap pad could have a thermal conductivity of 1.5 W/m–K and could be conformable with a low-hardness texture. Other types of thermal transfer materials are possible and contemplated.

One or more elements of optical system 100 and/or optical system 300 could be selected and/or utilized to achieve passive athermalization of the optical system 100 or 300. For examples, materials of optical systems 100 and 300 could be selected so as to reduce the temperature and stress-related movement of certain parts (e.g., substrate 120 and image sensor 130) with respect to others (e.g., lens assembly 110 and lens 112) as described in the present disclosure. In particular, the various material CTEs could be taken into account when designing the optical systems 100 and 300. Additionally or alternatively, a low CTE solder (e.g., indium wire, indium preforms, low CTE molds, etc.) could be utilized to couple two or more parts to one another.

In an example embodiment, the CTEs of various materials abutting one another could be selected so that the combination of the CTE differences is substantially zero. For example, the combined CTE of the lens holder (of the lens assembly 110), active alignment bond 170, and the sensor holder 140 could be equal to the combined CTE of the ball grid array (connectors 132 as illustrated and described in reference to FIG. 7A), image sensor 130, lens 112, and temperature dependent focal length of lens 112. In one approach to achieve differential CTE compensation for optical system 100, materials and part shape and/or size could be adjusted so as to solve the equation:

$$CTE_{Lens\ Holder} + CTE_{Active\ Alignment\ Bond} + CTE_{Sensor\ Holder} = CTE_{Connector} + CTE_{Image\ Sensor} + CTE_{Lens} + \text{Temperature Dependent Focal Length of Lens}$$

in ppm/° C.

Such passive athermalization steps could be taken to minimize overall CTE mismatch between the various components of optical system 100 and to passively maintain the image sensor 130 substantially at the focal plane 118 over a wide range of normal operating temperatures (e.g., −40° C. and 85° C.). In some embodiments, one or more optical systems 100 could be attached or otherwise mounted to a vehicle, as described below.

III. Example Vehicles

Figure 4:
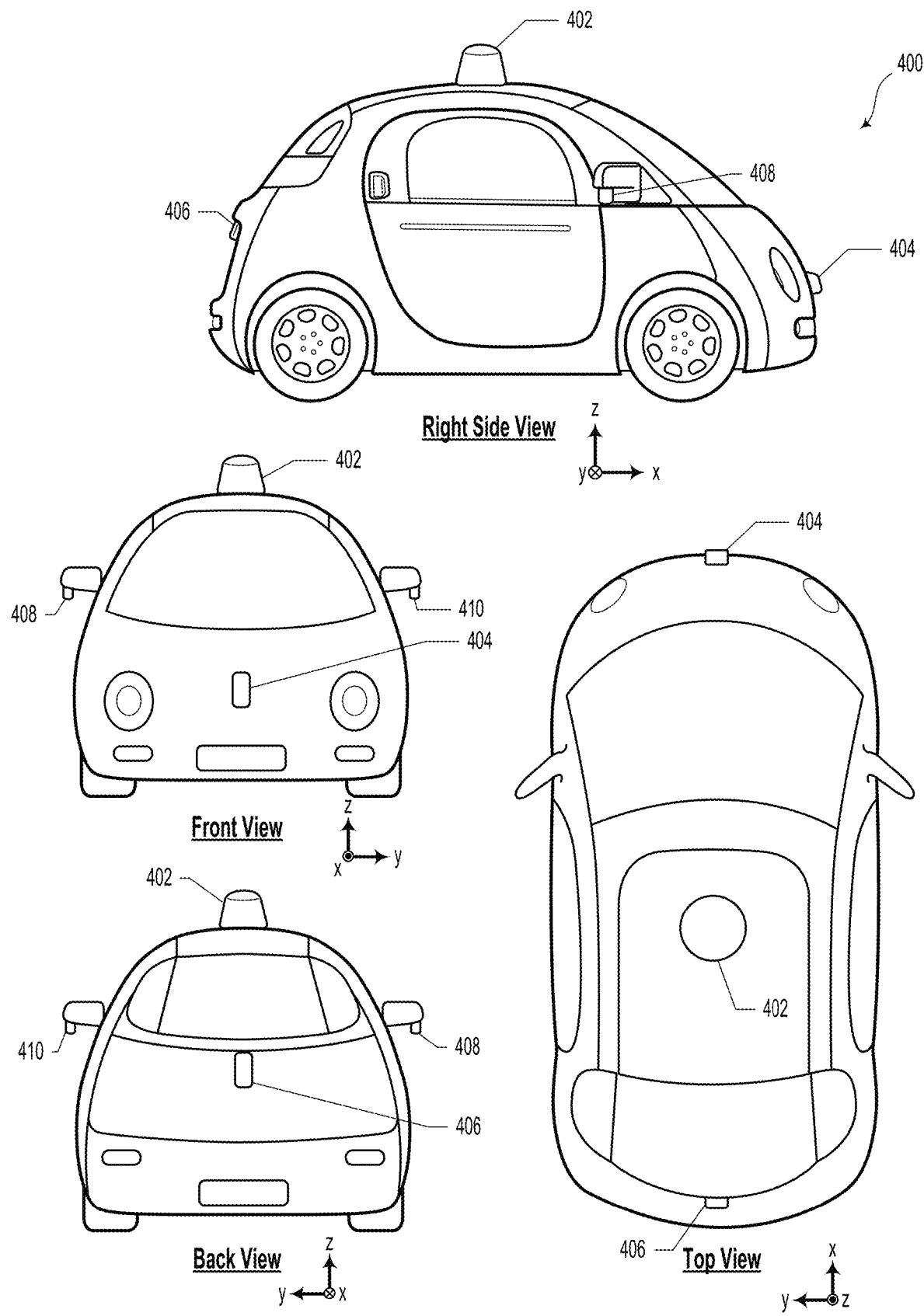
FIG. 4 illustrates a vehicle, according to an example embodiment.

FIG. 4 illustrates a vehicle 400, according to an example embodiment. The vehicle 400 could be a semi- or fully-autonomous vehicle. While FIG. 4 illustrates vehicle 400 as being an automobile (e.g., a car), it will be understood that vehicle 400 could include another type of autonomous vehicle, robot, or drone that can navigate within its environment using sensors and other information about its environment.

The vehicle 400 may include one or more sensor systems 402, 404, 406, 408, and 410. Some embodiments, sensor systems 402, 404, 406, 408, and 410 could include LIDAR sensors having a plurality of light-emitter devices arranged over a range of angles with respect to a given plane (e.g., the x-y plane).

One or more of the sensor systems 402, 404, 406, 408, and 410 may be configured to rotate about an axis (e.g., the z-axis) perpendicular to the given plane so as to illuminate an environment around the vehicle 400 with light pulses. Based on detecting various aspects of reflected light pulses (e.g., the elapsed time of flight, polarization, etc.), information about the environment may be determined.

In an example embodiment, sensor systems 402, 404, 406, 408, and 410 may be configured to provide respective point cloud information that may relate to physical objects within the environment of the vehicle 400. While vehicle 400 and sensor systems 402 and 404 are illustrated as including certain features, it will be understood that other types of sensor systems are contemplated within the scope of the present disclosure.

An example embodiment may include a system having a plurality of light-emitter devices. The system may include a transmit block of a LIDAR device. For example, the system may be, or may be part of, a LIDAR device of a vehicle (e.g., a car, a truck, a motorcycle, a golf cart, an aerial vehicle, a boat, etc.). Each light-emitter device of the plurality of light-emitter devices is configured to emit light pulses along a respective beam elevation angle. The respective beam elevation angles could be based on a reference angle or reference plane, as described elsewhere herein. In some embodiments, the reference plane may be based on an axis of motion of the vehicle 400.

While LIDAR systems with multiple light-emitter devices are described and illustrated herein, LIDAR systems with fewer light-emitter devices (e.g., a single light-emitter device) are also contemplated herein. For example, light pulses emitted by a laser diode may be controllably directed about an environment of the system. The angle of emission of the light pulses may be adjusted by a scanning device such as, for instance, a mechanical scanning mirror and/or a rotational motor. For example, the scanning devices could rotate in a reciprocating motion about a given axis and/or rotate about a vertical axis. In another embodiment, the light-emitter device may emit light pulses towards a spinning prism mirror, which may cause the light pulses to be emitted into the environment based on an angle of the prism mirror angle when interacting with each light pulse. Additionally or alternatively, scanning optics and/or other types of electro-opto-mechanical devices are possible to scan the light pulses about the environment.

In some embodiments, a single light-emitter device may emit light pulses according to a variable shot schedule and/or with variable power per shot, as described herein. That is, emission power and/or timing of each laser pulse or shot may be based on a respective elevation angle of the shot. Furthermore, the variable shot schedule could be based on providing a desired vertical spacing at a given distance from the LIDAR system or from a surface (e.g., a front bumper) of a given vehicle supporting the LIDAR system. As an example, when the light pulses from the light-emitter device are directed downwards, the power-per-shot could be decreased due to a shorter anticipated maximum distance to target. Conversely, light pulses emitted by the light-emitter device at an elevation angle above a reference plane may have a relatively higher power-per-shot so as to provide sufficient signal-to-noise to adequately detect pulses that travel longer distances.

In some embodiments, the power/energy-per-shot could be controlled for each shot in a dynamic fashion. In other embodiments, the power/energy-per-shot could be controlled for successive set of several pulses (e.g., 10 light pulses). That is, the characteristics of the light pulse train could be changed on a per-pulse basis and/or a per-several-pulse basis.

While FIG. 4 illustrates various LIDAR sensors attached to the vehicle 400, it will be understood that the vehicle 400 could incorporate other types of sensors, such as a plurality of optical systems, as described below.

Figure 5:
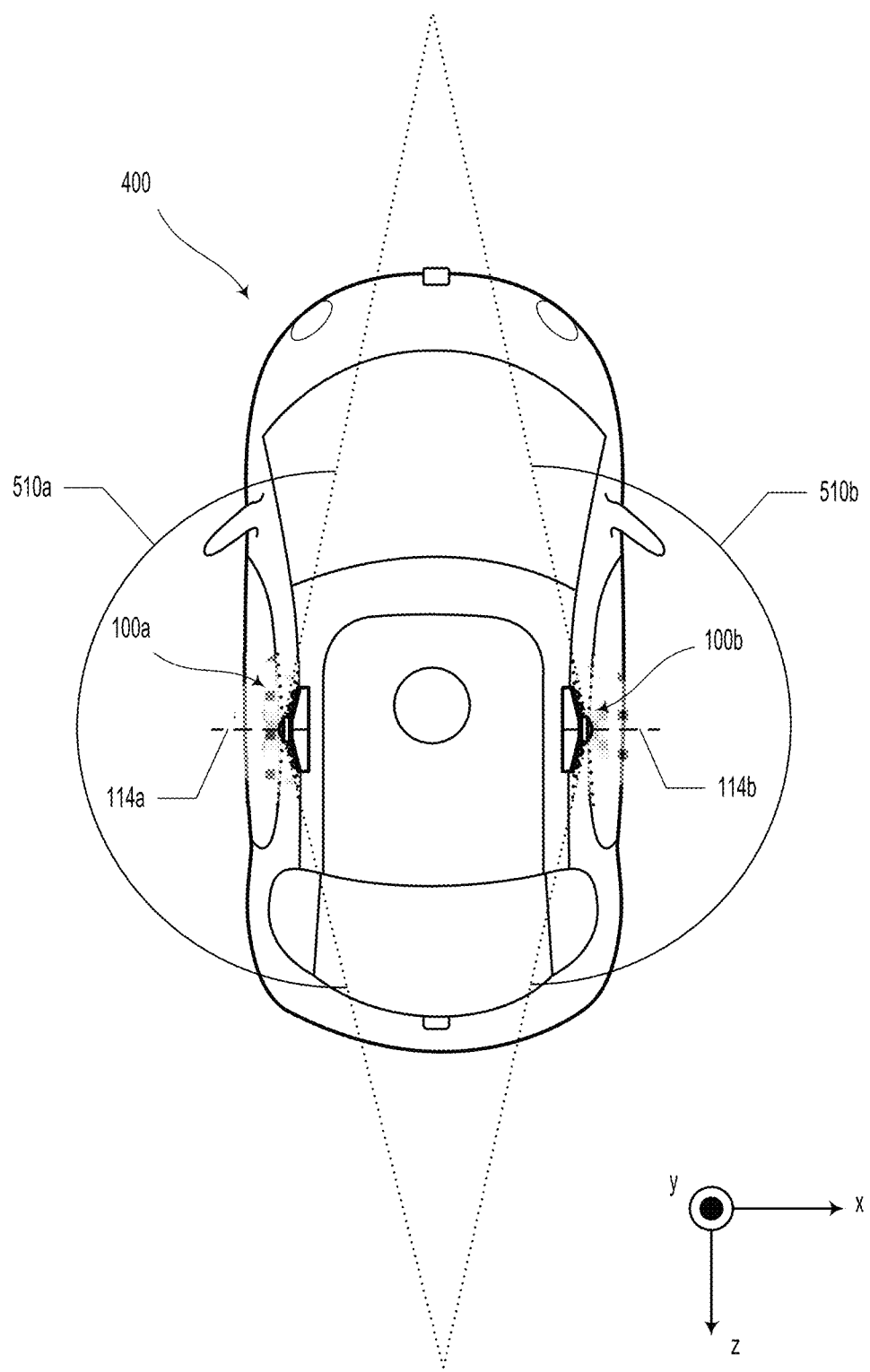
FIG. 5 illustrates the vehicle of FIG. 4, according to an example embodiment.

FIG. 5 illustrates the vehicle 400 of FIG. 4, according to an example embodiment. In some embodiments, the vehicle 400 could include one or more instances of optical system 100 as illustrated and described in reference to FIGS. 1 and/or 3. As illustrated in FIG. 5, one or more optical systems described herein (e.g., optical systems 100a and 100b) could be mounted or otherwise coupled to the vehicle 400. In such examples, the optical system 100a could provide an optical axis 114a and a field of view 510a. Correspondingly, the optical system 100b could provide an optical axis 114b and a field of view 510b. While a relatively wide field of view (e.g., 190 degree cone) is illustrated herein, it will be understood that other cone angles are possible for optical systems 100a and 100b.

In some embodiments, optical systems 100a and 100b could include—or be in communication with—a controller 150 having at least one processor 152 and a memory 154. In such scenarios, the controller is configured to execute instructions stored in the memory so as to carry out operations. The operations could include causing the respective image sensors 130 to capture images of at least a portion of an environment of the vehicle 400. For example, the operations could include capturing a plurality of images using the image sensor 130 so as to provide information about the environment of the vehicle 400. In some embodiments, the images could be used to determine objects and/or obstacles within the environment.

IV. Example Methods of Manufacture

Figure 6:
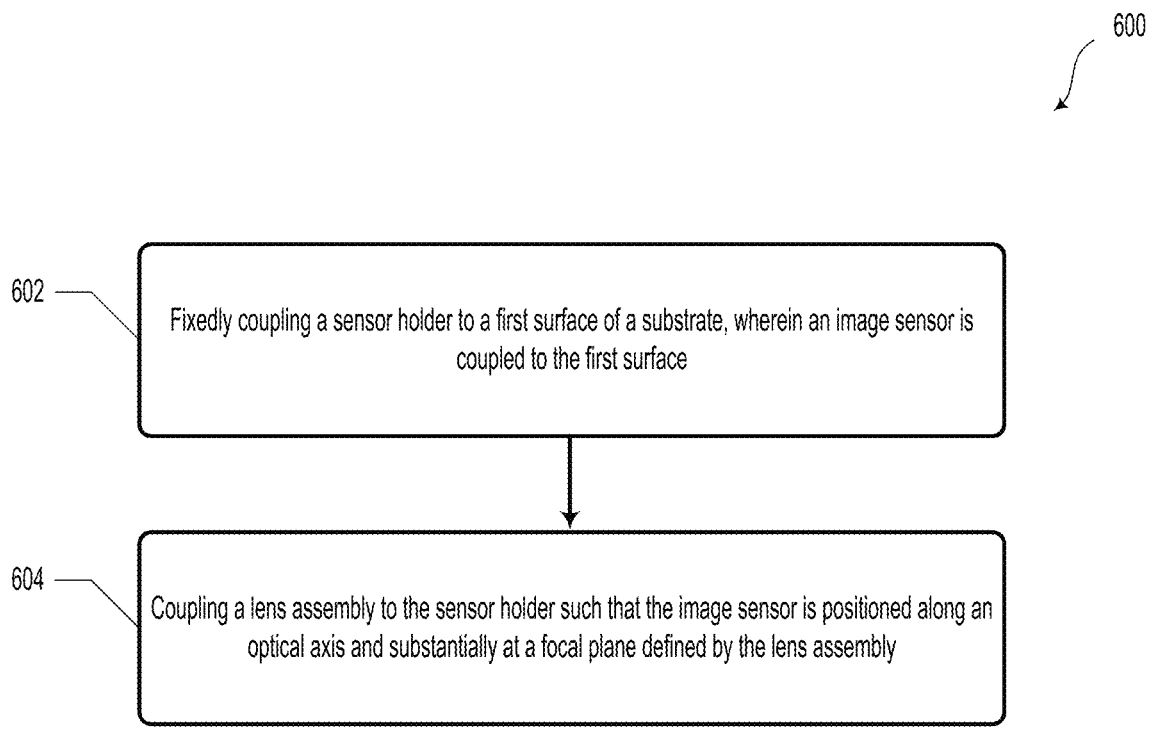
FIG. 6 illustrates a method, according to an example embodiment.
Figure 7A:
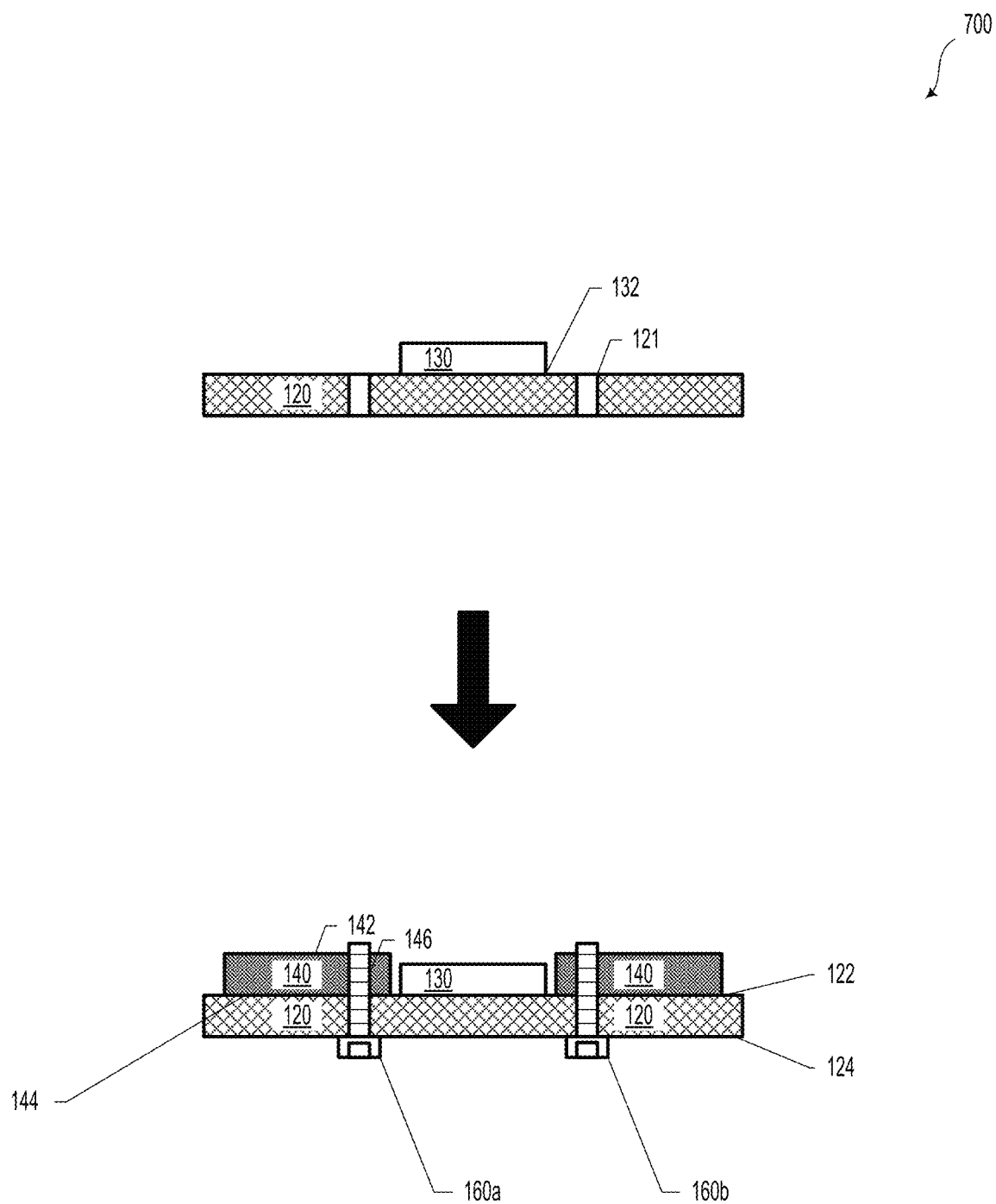
FIG. 7A illustrates a portion of the method of FIG. 6, according to an example embodiment.
Figure 7B:
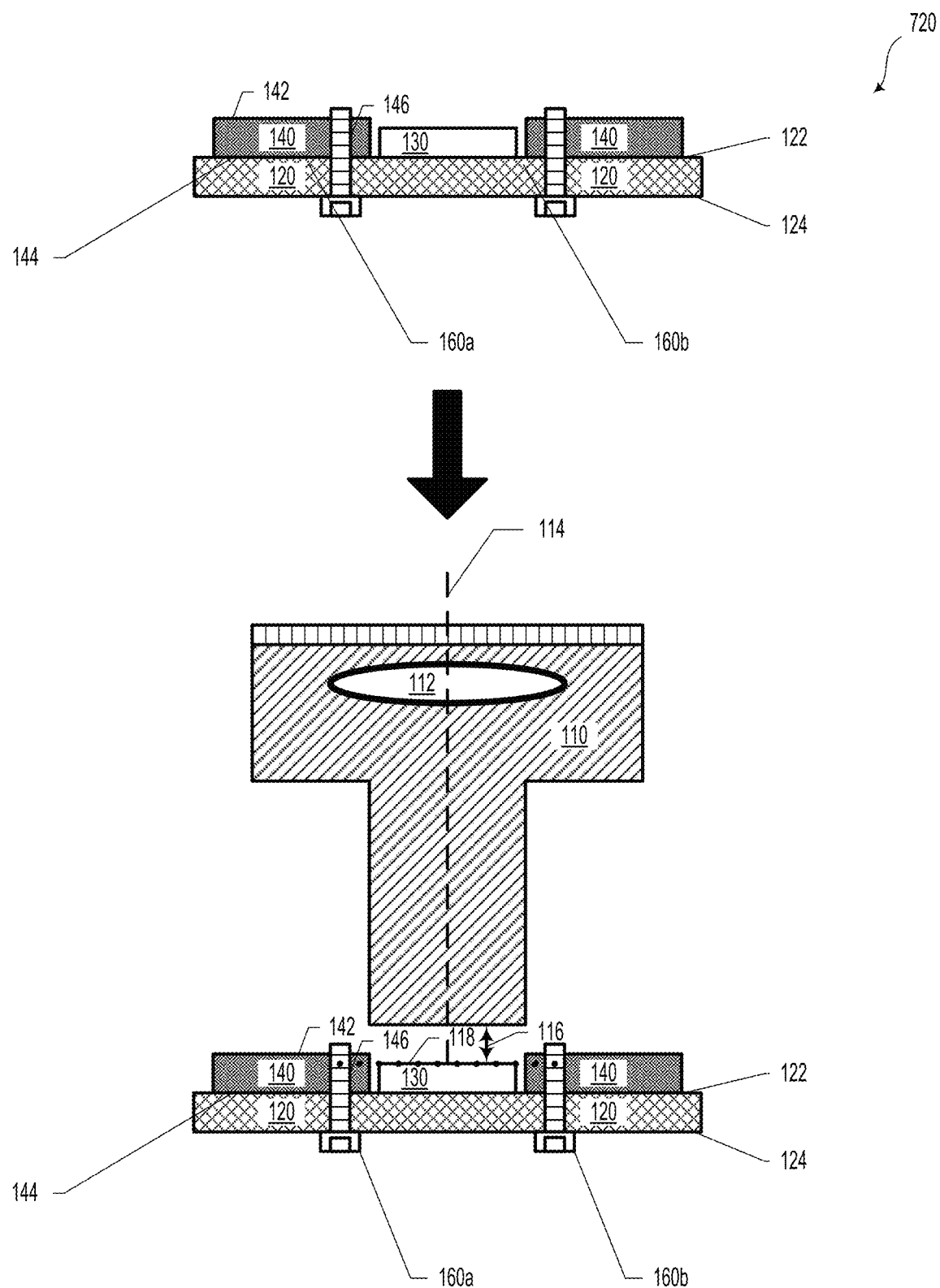
FIG. 7B illustrates a portion of the method of FIG. 6, according to an example embodiment.
Figure 7C:
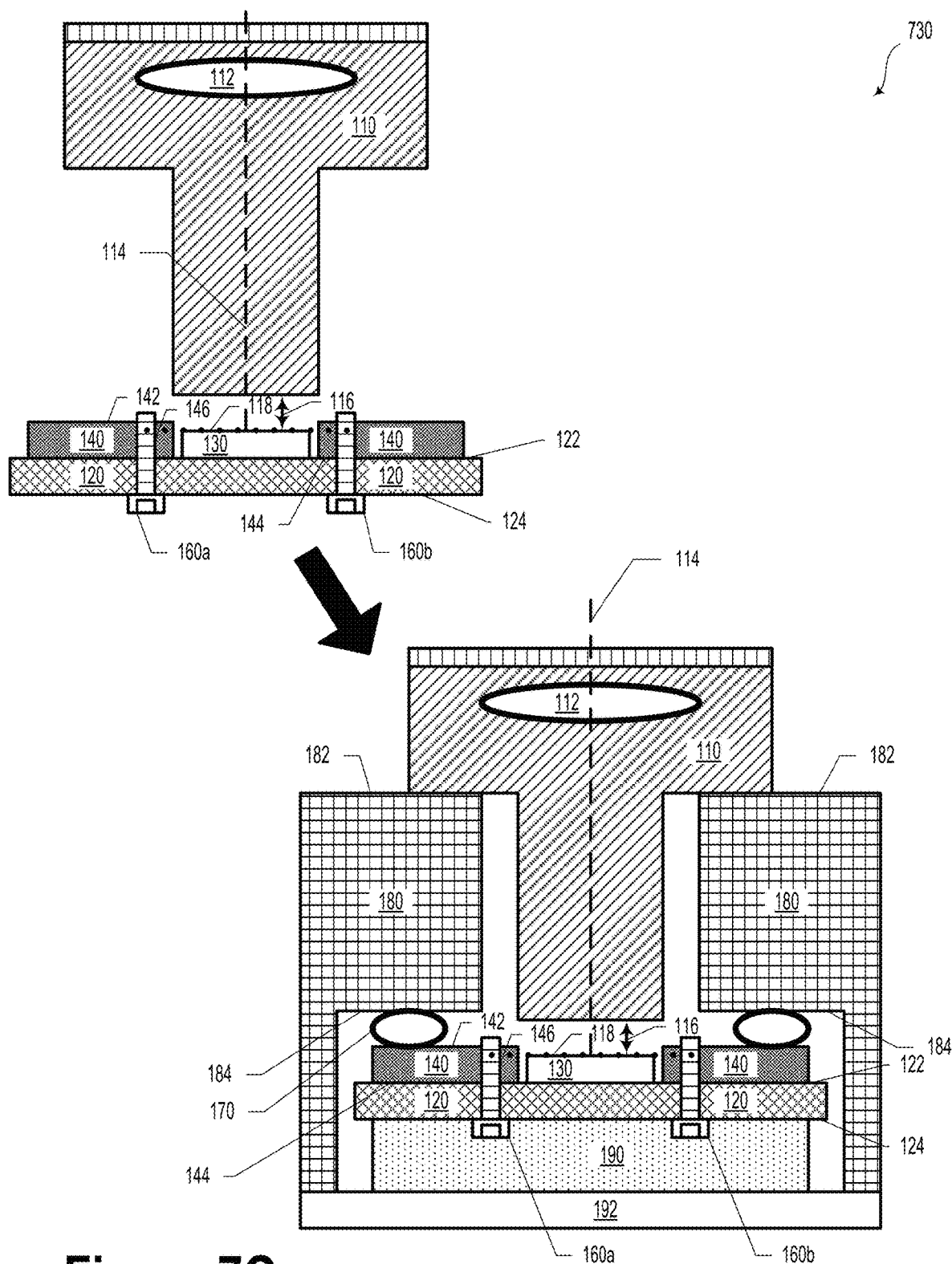
FIG. 7C illustrates a portion of the method of FIG. 6, according to an example embodiment.

FIG. 6 illustrates a method 600, according to an example embodiment. FIGS. 7A, 7B, and 7C illustrate one or more blocks of the method 600 of FIG. 6, according to an example embodiment. It will be understood that the method 600 may include fewer or more steps or blocks than those expressly illustrated or otherwise disclosed herein. Furthermore, respective steps or blocks of method 600 may be performed in any order and each step or block may be performed one or more times. In some embodiments, some or all of the blocks or steps of method 600 may relate to elements of the optical system 100 and/or the vehicle 500 as illustrated and described in relation to FIGS. 1, 3, 4, and 5.

Block 602 includes coupling a sensor holder to a first surface of a substrate. An image sensor is coupled to the first surface. In an example embodiment, coupling the sensor holder to the first surface of the substrate could be performed by way of a plurality of fasteners. In such embodiments, the sensor holder could include one or more threaded through holes. The plurality of fasteners could include at least two bolts. In such scenarios, the respective bolts can pass through the substrate and thread into the sensor holder plate, so as to apply a compressive force on the substrate. Additionally or alternatively, the sensor holder could be coupled to the first surface of the substrate using an adhesive such as glue or another bonding agent.

In reference to FIG. 7A, scenario 700 illustrates the coupling of sensor holder 140 to a first surface 122 of the substrate 120. In such a scenario, image sensor 130 could be initially coupled to the substrate 120 by way of connectors 132, which could include a ball grid array (BGA), pin grid array (PGA), land grid array (LGA), or another type of electrical and/or physical connector. Furthermore, the substrate 120 could include one or more substrate through holes 121. In an example embodiment, the substrate through holes 121 could be pre-drilled in the substrate 120.

Furthermore, scenario 700 includes that the sensor holder 140 is attached to the first surface 122 of the substrate 120 by way of a plurality of fasteners 160a and 160b. As an example, the fasteners 160a and 160b could include threaded bolts. For example, the threaded bolts could have heads that abut the second surface 124 of the substrate 120 and thread into threaded through holes 146 provided in the sensor holder 140. Other types of connectors and/or fasteners are contemplated (e.g., staple, nut and bolt, spring clip, clamp, etc.). While the threaded bolts are illustrated as passing through the sensor holder 140, it will be understood that the bolts could engage threaded holes and/or threaded inserts that are attached to the sensor holder 140 and which need not pass completely through both the first sensor holder surface 142 and the second sensor holder surface 144.

Returning to FIG. 6, block 604 includes coupling a lens assembly to the sensor holder such that the image sensor is positioned along an optical axis and substantially at a focal plane defined by the lens assembly. In some embodiments, coupling the lens assembly to the sensor holder includes coupling the lens assembly to a first registration surface of a registration body. Furthermore, coupling the lens assembly to the sensor holder includes coupling the sensor holder to a second registration surface of the registration body.

In reference to FIG. 7B, scenario 720 illustrates positioning the sensor holder 140, substrate 120, and image sensor 130 with respect to the lens assembly 110 so that the image sensor 130 is substantially positioned along the optical axis 114 and substantially parallel with the focal plane 118, which is located perpendicular to the optical axis 114 at the focal distance 116. Additionally or alternatively, at one or more times during the course of method 600 and/or after carrying out the blocks of method 600, various components (e.g., image sensor 130 and sensor holder 140) could be subjected to thermal cycling. For example, the image sensor 130, the sensor holder 140, and/or other components of optical system 100 could be subjected to multiple thermal cycle using, for example, a thermal cycling test chamber. Such thermal cycling prior to, during, and/or after carrying out method 600 could help reduce or minimize thermal-cycle-induced movement of components of the systems described herein prior to, during, and/or after, the active alignment process. In other words, by performing thermal cycling "pretreatments," the constituent parts may be less likely to exhibit thermally-induced expansion/contraction and/or relative movement in relation to other system components.

In reference to FIG. 7C, scenario 730 illustrates coupling of the lens assembly 110 to the sensor holder 140 by way of a registration body 180. For example, a surface of the lens assembly 110 (e.g., a lens flange) could be positioned to abut the first registration surface 182. Furthermore, the sensor holder 140 could be positioned with respect to the lens assembly 110 by way of an active alignment process. In such a scenario, the image sensor 130 could provide images while adjusting a position of the sensor holder 140 with respect to the lens assembly 110. When an optimized focus position is obtained, an active alignment bond 170 (e.g., epoxy resin) could be applied so as to fix the relative position of the sensor holder 140 and the second registration surface 184—and thus fix the relative position of the image sensor 130 with respect to the lens assembly 110 in an effort to beneficially maintain the image sensor 130 at the optimal focus position.

As described herein, the active alignment bond could include another type of adhesive, thermoset polymer, or fixant (e.g., hardener or curative). It will be understood that the various active alignment bond materials may include respective curing temperatures and/or other hardening procedures.

In some embodiments, the respective bolts are torqued so as to prevent movement of the substrate and the image sensor with respect to the lens assembly due to thermal-cycle-induced debowing or destressing. For example, the respective bolts could be torqued or otherwise adjusted so as to maintain a position of the image sensor within 10 microns of the focal plane of the lens assembly.

In various examples, the method 600 could include thermally coupling a second surface of the substrate to a housing by way of a thermal transfer material. The thermal transfer material could include a thermal conductivity of at least 1.0 W/(m·K). For example, the thermal transfer material could include a thermal gap pad.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. An optical system comprising:
   a lens assembly comprising at least one lens, wherein the lens assembly defines an optical axis, a focal distance, and a corresponding focal plane;
   a substrate having a first surface;
   an image sensor attached to the first surface of the substrate; and
   a sensor holder attached to the first surface of the substrate, wherein the sensor holder positions the image sensor along the optical axis and substantially at the focal plane.

2. The optical system of claim 1, further comprising a registration body having a first registration surface and a second registration surface, wherein the lens assembly is coupled to the first registration surface and the sensor holder is coupled to the second registration surface.

3. The optical system of claim 2, wherein the sensor holder is coupled to the second registration surface by way of an active alignment bond, wherein the active alignment bond comprises epoxy.

4. The optical system of claim 1, wherein the lens assembly provides an f-number less than or equal to 2.8, wherein the f-number is defined by the focal distance divided by a diameter of an aperture of the lens assembly.

5. The optical system of claim 1, wherein the focal distance is a fixed focal length.

6. The optical system of claim 1, wherein the sensor holder is coupled to the first surface of the substrate by way of a plurality of fasteners, wherein the sensor holder is threaded, wherein the plurality of fasteners comprise at least two bolts, wherein the respective bolts pass through the substrate and thread into the sensor holder, so as to apply a compressive force on the substrate.

7. The optical system of claim 1, wherein the sensor holder prevents movement of the substrate and the image sensor with respect to the lens assembly due to thermal-cycle-induced debowing or destressing.

8. The optical system of claim 1, wherein the sensor holder maintains a position of the image sensor within 10 microns of the focal plane of the lens assembly.

9. The optical system of claim 1, wherein the sensor holder maintains a position of the image sensor with respect to the lens assembly over at least 25 thermal cycles between −40° C. to 85° C.

10. The optical system of claim 1, further comprising:
    a housing; and
    a thermal transfer material arranged between a second surface of the substrate and the housing, wherein the thermal transfer material has a thermal conductivity of at least 1.0 W/(m·K).

11. The optical system of claim 10, wherein the thermal transfer material comprises a thermal gap pad.

12. The optical system of claim 1, wherein the optical system is configured to be mounted on a vehicle.

13. The optical system of claim 12, further comprising a controller having at least one processor and a memory, wherein the controller executes instructions stored in the memory so as to carry out operations, wherein the operations comprise:
    causing the image sensor to capture images of at least a portion of an environment of the vehicle.

14. A method of manufacturing comprising:
    coupling a sensor holder to a first surface of a substrate, wherein an image sensor is coupled to the first surface; and
    coupling a lens assembly to the sensor holder such that the image sensor is positioned along an optical axis and substantially at a focal plane defined by the lens assembly.

15. The method of manufacturing of claim 14, wherein coupling the lens assembly to the sensor holder comprises:
    coupling the lens assembly to a first registration surface of a registration body; and
    coupling the sensor holder to a second registration surface of the registration body.

16. The method of manufacturing of claim 15, wherein coupling the sensor holder to the second registration surface is performed by way of an active alignment bond, wherein the active alignment bond comprises epoxy.

17. The method of manufacturing of claim 14, wherein coupling the sensor holder to the first surface of the substrate is performed by way of a plurality of fasteners, wherein the sensor holder is threaded, wherein the plurality of fasteners comprise at least two bolts, wherein the respective bolts pass through the substrate and thread into the sensor holder plate, so as to apply a compressive force on the substrate.

18. The method of manufacturing of claim 17, wherein the respective bolts are torqued so as to prevent movement of the substrate and the image sensor with respect to the lens assembly due to thermal-cycle-induced debowing or destressing.

19. The method of manufacturing of claim 17, wherein the respective bolts are torqued so as to maintain a position of the image sensor within 10 microns of the focal plane of the lens assembly.

20. The method of manufacturing of claim 17, further comprising:
    thermally coupling a second surface of the substrate to a housing by way of a thermal transfer material, wherein the thermal transfer material has a thermal conductivity of at least 1.0 W/(m·K).

* * * * *